US012651389B2

(12) United States Patent
Liu et al.

(10) Patent No.: US 12,651,389 B2
(45) Date of Patent: Jun. 9, 2026

(54) METHOD, ELECTRONIC DEVICE, AND COMPUTER PROGRAM PRODUCT FOR GENERATING IMAGES

(71) Applicant: Dell Products L.P., Round Rock, TX (US)

(72) Inventors: Zhisong Liu, Shenzhen (CN); Zijia Wang, Weifang (CN); Min Gong, Shanghai (CN); Lu Lei, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 18/342,068

(22) Filed: Jun. 27, 2023

(65) Prior Publication Data

US 2024/0404145 A1 Dec. 5, 2024

(30) Foreign Application Priority Data

Jun. 1, 2023 (CN) .......................... 202310646119.5

(51) Int. Cl.
*G06T 11/60* (2026.01)
*G06T 7/11* (2017.01)
(Continued)

(52) U.S. Cl.
CPC ................ *G06T 11/60* (2013.01); *G06T 7/11* (2017.01); *G06V 10/761* (2022.01);
(Continued)

(58) Field of Classification Search
None
See application file for complete search history.

(56) References Cited

U.S. PATENT DOCUMENTS 12,067,646 B2 * 8/2024 Zhang ................. G06F 18/2148
12,142,027 B1 * 11/2024 Saraee ................... G06N 3/045
(Continued)

OTHER PUBLICATIONS

Li et al. "GLIGEN: Open Set Grounded Text-to-Image Generation", arXiv:2301.07093v2 [cs. CV] Apr. 17, 2023 (Year: 2023).*
(Continued)

*Primary Examiner* — Randolph I Chu
(74) *Attorney, Agent, or Firm* — Ryan, Mason & Lewis, LLP

(57) ABSTRACT

Embodiments of the present disclosure provide a method, an electronic device, and a computer program product for generating images. The method includes acquiring a descriptive text for describing image content of a target image, determining position prior information, and generating the target image based on the descriptive text and position prior information. According to the method of the embodiments of the present disclosure, a target image that can be used for rare data simulation in rare scenarios can be generated by means of an input descriptive text. In addition, the method allows for position perception editing and operation, and can control, based on position prior information, a direction and a position of an object generated in the target image, thereby effectively and diversely generating images. Moreover, the method provided in the present disclosure is based on object types in each subdivided image block, thus making position perception more accurate.

20 Claims, 6 Drawing Sheets

(51) Int. Cl.

| | |
|---|---|
| *G06V 10/74* | (2022.01) |
| *G06V 10/774* | (2022.01) |
| *G06V 10/776* | (2022.01) |
| *G06V 10/80* | (2022.01) |

(52) U.S. Cl.
CPC .......... *G06V 10/774* (2022.01); *G06V 10/776* (2022.01); *G06V 10/806* (2022.01); *G06T 2207/20021* (2013.01); *G06T 2207/20081* (2013.01)

(56) References Cited

U.S. PATENT DOCUMENTS

| | | | |
|---|---|---|---|
| 2022/0301237 A1* | 9/2022 | Suzuki ................... | G06V 10/82 |
| 2024/0098315 A1* | 3/2024 | Sethia ................ | H04N 21/4666 |
| 2024/0203005 A1* | 6/2024 | Palangi ..................... | G06T 7/60 |
| 2024/0355010 A1* | 10/2024 | Ahafonov ............. | G06T 11/001 |
| 2024/0378832 A1* | 11/2024 | Joachim ................... | G06T 5/50 |
| 2024/0404145 A1* | 12/2024 | Liu ........................ | G06V 10/82 |
| 2025/0013417 A1* | 1/2025 | Dehkordi ................ | G06F 9/451 |
| 2025/0054008 A1* | 2/2025 | Cella ...................... | G06N 5/043 |
| 2025/0242092 A1* | 7/2025 | Weikart .................... | A61J 1/00 |

OTHER PUBLICATIONS

Dai et al., "Deformable Convolutional Networks", arXiv:1703.06211v3 [cs.CV] Jun. 5, 2017 (Year: 2017).*

Deformable Convolutional Networks (Year: 2017).*

I. J. Goodfellow et al., "Generative Adversarial Nets," Advances in Neural Information Processing Systems, arXiv:1406.2661v1, Jun. 10, 2014, 9 pages.

C. Ledig et al., "Photo-Realistic Single Image Super-Resolution Using a Generative Adversarial Network," IEEE Conference on Computer Vision and Pattern Recognition (CVPR), arXiv:1609.04802v5, May 25, 2017, 19 pages.

X. Wang et al., "ESRGAN: Enhanced Super-Resolution Generative Adversarial Networks," IEEE Conference on Computer Vision and Pattern Recognition, Sep. 2018, 16 pages.

A. Jolicoeur-Martineau, "The Relativistic Discriminator: A Key Element Missing from Standard GAN," International Conference on Learning Representations, Jul. 2, 2018, 26 pages.

N. C. Rakotonirina et al., "ESRGAN+: Further Improving Enhanced Super-Resolution Generative Adversarial Network," IEEE International Conference on Acoustics, Speech and Signal Processing, arXiv:2001.08073v2, Jul. 15, 2020, 5 pages.

J. Devlin et al., "BERT: Pre-training of Deep Bidirectional Transformers for Language Understanding," arXiv:1810.04805v2, May 24, 2019, 16 pages.

Z.-S. Liu et al., "Reference Based Face Super-Resolution," IEEE Access, vol. 7, Sep. 23, 2019, pp. 129112-129126.

J. Engel et al., "Latent Constraints: Learning to Generate Conditionally from Unconditional Generative Models," arXiv:1711.05772v2, Dec. 21, 2017, 22 pages.

Z.-S. Liu et al., "Unsupervised Real Image Super-Resolution via Generative Variational AutoEncoder," IEEE International Conference on Computer Vision and Pattern Recognition Workshop, arXiv:2004.12811v1, Apr. 27, 2020, 10 pages.

A. Lugmayr et al., "SRFlow: Learning the Super-Resolution Space with Normalizing Flow," European Conference on Computer Vision, arXiv:2006.14200v2, Jul. 31, 2020, 32 pages.

Y. Bahat et al., "Explorable Super Resolution," IEEE/CVF Conference on Computer Vision and Pattern Recognition, Jun. 2020, pp. 2716-2725.

M. C. Bühler et al., "DeepSEE: Deep Disentangled Semantic Explorative Extreme Super-Resolution," Asian Conference on Computer Vision, arXiv:2004.04433v3, Oct. 2, 2020, 19 pages.

A. Radford et al., "Learning Transferable Visual Models From Natural Language Supervision," International Conference on Machine Learning, arXiv:2103.00020v1, Feb. 26, 2021, 48 pages.

A. Van Den Oord et al., "Neural Discrete Representation Learning," Conference on Neural Information Processing Systems, Dec. 2017, 10 pages.

A. Razavi et al., "Generating Diverse High-Fidelity Images with VQ-VAE-2," Conference on Neural Information Processing Systems, Dec. 2019, 11 pages.

A. Kuhnle et al., "ShapeWorld: A New Test Methodology for Multimodal Language Understanding," arXiv:1704.04517v1, Apr. 14, 2017, 10 pages.

N. Audebert et al., "Multimodal Deep Networks for Text and Image-Based Document Classification," Joint European Conference on Machine Learning and Knowledge Discovery in Databases, arXiv:1907.06370v1, Jul. 15, 2019, 8 pages.

F. Bianchi et al., "Contrastive Language-Image Pre-training for the Italian Language," arXiv:2108.08688v1, Aug. 19, 2021, 7 pages.

A. Ramesh et al., "Zero-Shot Text-to-Image Generation," International Conference on Machine Learning, arXiv:2102.12092v2, Feb. 26, 2021, 20 pages.

A. Ramesh et al., "Hierarchical Text-Conditional Image Generation with CLIP Latents," arXiv:2204.06125v1, Apr. 13, 2022, 27 pages.

A. Nichol et al., "GLIDE: Towards Photorealistic Image Generation and Editing with Text-Guided Diffusion Models," arXiv:2112.10741v3, Mar. 8, 2022, 20 pages.

R. Gal et al., "StyleGAN-NADA: CLIP-Guided Domain Adaptation of Image Generators," arXiv:2108.00946v2, Dec. 16, 2021, 25 pages.

K. Frans et al., "CLIPDraw: Exploring Text-to-Drawing Synthesis through Language-Image Encoder," arXiv:2106.14843v1, Jun. 28, 2021, 9 pages.

P. Schaldenbrand et al., "StyleCLIPDraw: Coupling Content and Style in Text-to-Drawing Synthesis," arXiv:2111.03133v2, Mar. 1, 2022, 3 pages.

O. Patashnik et al., "StyleCLIP: Text-Driven Manipulation of StyleGAN Imagery," arXiv:2103.17249v1, Mar. 31, 2021, 18 pages.

S. Schwettmann et al., "Toward a Visual Concept Vocabulary for GAN Latent Space," arXiv:2110.04292v1, Oct. 8, 2021, 15 pages.

H. Luo et al., "UniVL: A Unified Video and Language Pre-Training Model for Multimodal Understanding and Generation," arXiv:2002.06353v3, Sep. 15, 2020, 15 pages.

H. Fang et al., "CLIP2Video: Mastering Video-Text Retrieval via Image CLIP," arXiv:2106.11097v1, Jun. 21, 2021, 10 pages.

H. Luo et al., "CLIP4Clip: An Empirical Study of CLIP for End to End Video Clip Retrieval," arXiv:2104.08860v2, May 8, 2021, 14 pages.

T.-J. Fu et al., "Language-Driven Artistic Style Transfer," arXiv:2106.00178v3, Jul. 17, 2022, 20 pages.

G. Kwon et al., "CLIPstyler: Image Style Transfer with a Single Text Condition," arXiv:2112.00374v3, Mar. 19, 2022, 22 pages.

P. Schaldenbrand et al., "StyleCLIPDraw: Coupling Content and Style in Text-to-Drawing Translation," arXiv:2202.12362v1, Feb. 24, 2022, 8 pages.

Z. Liu et al., "Photo-Realistic Image Super-Resolution via Variational Autoencoders," IEEE Transactions on Circuits and Systems for Video Technology, vol. 31, No. 4, Apr. 2021, 15 pages.

T.-C. Wang et al., "High-Resolution Image Synthesis and Semantic Manipulation with Conditional GANs," IEEE/CVF Conference on Computer Vision and Pattern Recognition, Nov. 30, 2017, pp. 8798-8807.

D. P. Kingma et al., "Auto-Encoding Variational Bayes," arXiv:1312.6114v11, Dec. 10, 2022, 14 pages.

D. J. Rezende et al., "Variational Inference with Normalizing Flows," 32nd International Conference on Machine Learning, vol. 37, Jul. 2015, 9 pages.

J. Sohl-Dickstein et al., "Deep Unsupervised Learning using Nonequilibrium Thermodynamics," 32nd International Conference on Machine Learning, vol. 37, Jul. 2015, 10 pages.

D. P. Kingma et al., "Glow: Generative Flow with Invertible 1x1 Convolutions," 32nd Conference on Neural Information Processing Systems, Dec. 2018, 10 pages.

(56)          References Cited

OTHER PUBLICATIONS

U.S. Appl. No. 17/989,831 filed in the name of Zhisong Liu et al. on Nov. 18, 2022, and entitled "Method, Electronic Device and Computer Program Product for Data Processing."

* cited by examiner

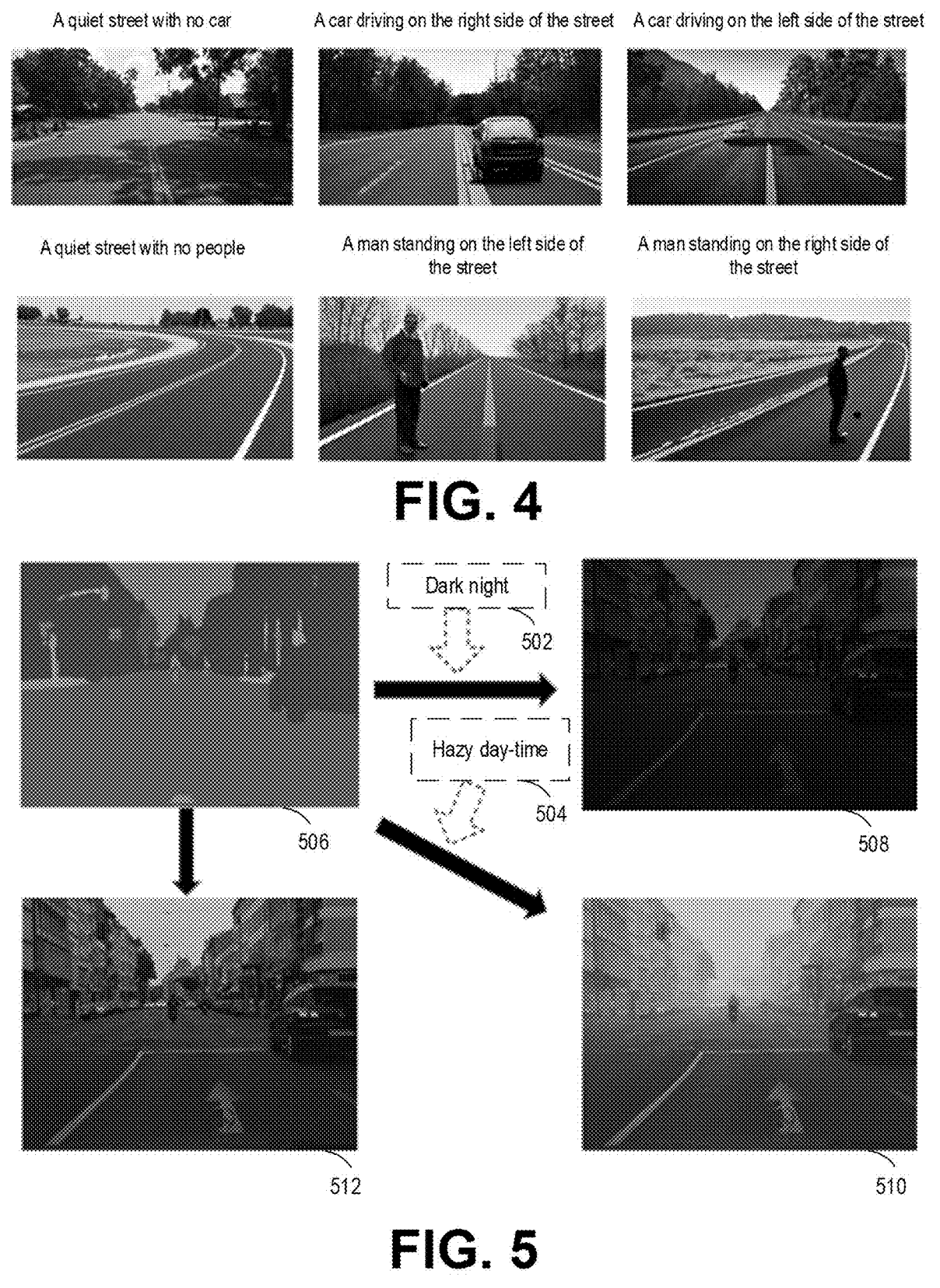

A quiet street with no car

A car driving on the right side of the street

A car driving on the left side of the street

A quiet street with no people

A man standing on the left side of the street

A man standing on the right side of the street

FIG. 4

Dark night 502

Hazy day-time 504

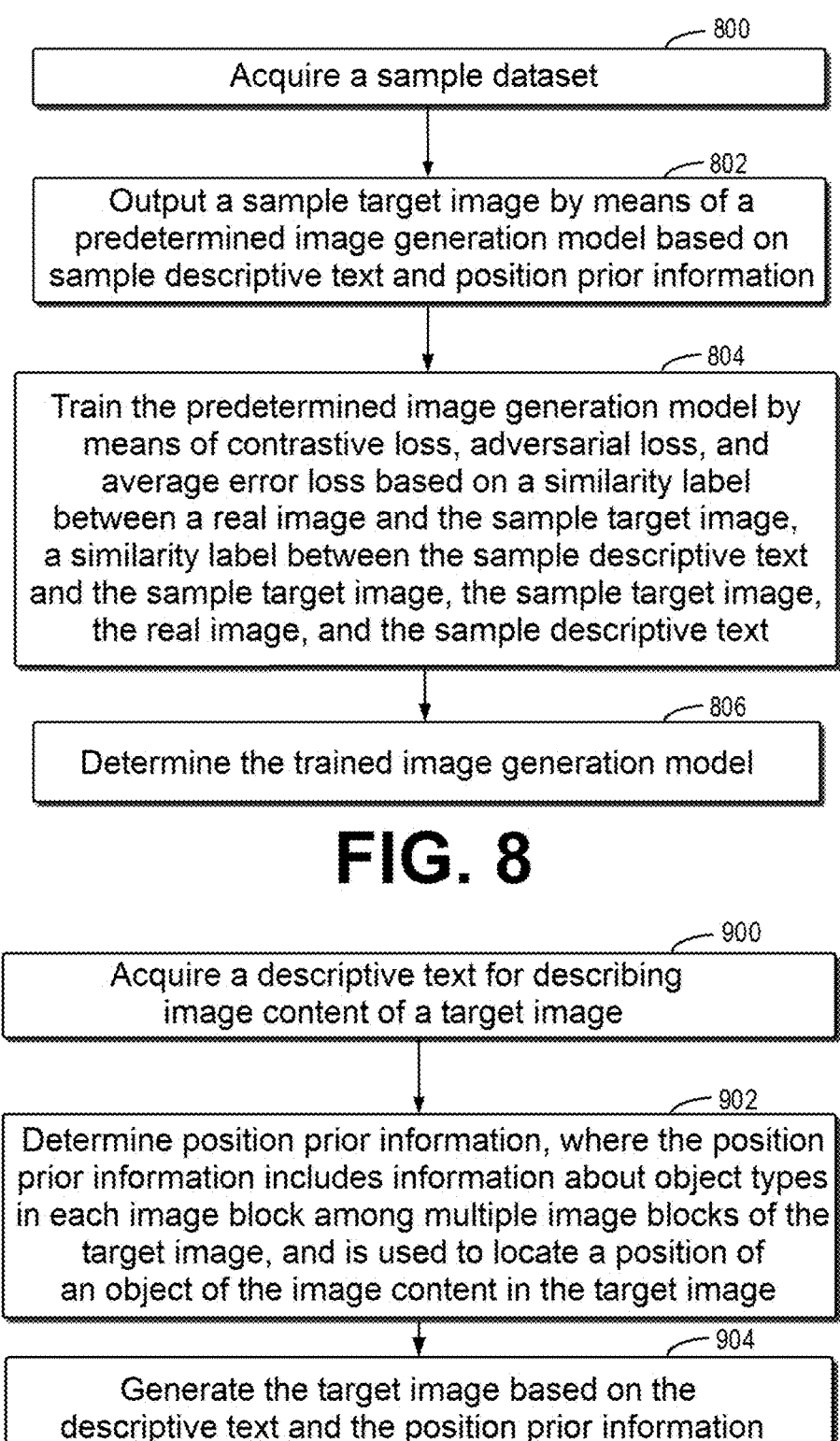

┌─ 800
Acquire a sample dataset

┌─ 802
Output a sample target image by means of a predetermined image generation model based on sample descriptive text and position prior information ┌─ 804
Train the predetermined image generation model by means of contrastive loss, adversarial loss, and average error loss based on a similarity label between a real image and the sample target image, a similarity label between the sample descriptive text and the sample target image, the sample target image, the real image, and the sample descriptive text ┌─ 806
Determine the trained image generation model

FIG. 8

┌─ 900
Acquire a descriptive text for describing image content of a target image ┌─ 902
Determine position prior information, where the position prior information includes information about object types in each image block among multiple image blocks of the target image, and is used to locate a position of an object of the image content in the target image ┌─ 904
Generate the target image based on the descriptive text and the position prior information

FIG. 9

METHOD, ELECTRONIC DEVICE, AND COMPUTER PROGRAM PRODUCT FOR GENERATING IMAGES

RELATED APPLICATION

The present application claims priority to Chinese Patent Application No. 202310646119.5, filed Jun. 1, 2023, and entitled "Method, Electronic Device, and Computer Program Product for Generating Images," which is incorporated by reference herein in its entirety.

FIELD

Embodiments of the present disclosure relate to the technical field of computers, and more specifically, relate to a method, an electronic device, and a computer program product for generating images.

BACKGROUND

To provide large numbers of training samples for artificial intelligence models for scene simulation, various technologies are currently used to automatically create images under many different conditions without manually collecting and annotating data. For example, when training artificial intelligence models in fields such as security, autonomous driving, and healthcare, in order to improve their effects, it is necessary to provide a large number of training samples by means of an image generation technology.

For example, autonomous driving utilizes computer vision and deep learning to simulate driving behaviors similar to those of human beings. More specifically, to establish a fully automated vehicle, it is important to have a powerful and effective model to understand the three-dimensional world. However, challenges are caused by the complex and ever-changing environment around the world. For the same street, the scene changes every year, season, day, and minute. The scenes captured by cameras can be enormous, and having a robust and accurate estimation is a great challenge for deep learning models.

SUMMARY

According to example embodiments of the present disclosure, a technical solution for generating images is provided, which controls a direction and a position of an object generated in a target image based on position prior information, thereby effectively and diversely generating images.

In a first aspect of the present disclosure, a method is provided. The method includes acquiring a descriptive text for describing image content of a target image, determining position prior information, where the position prior information indicates object types in each image block among multiple image blocks of the target image, and the position prior information is used to locate a position of an object in the image content in the target image, and generating the target image based on the descriptive text and the position prior information. By means of implementation of the method provided in the first aspect, a direction and a position of an object generated in the target image can be controlled based on the position prior information, thereby effectively and diversely generating images.

In a second aspect of the present disclosure, an electronic device is provided. The electronic device includes: a processor; and a memory coupled to the processor and having instructions stored therein, where the instructions, when executed by the electronic device, cause the electronic device to perform operations including: acquiring a descriptive text for describing image content of a target image, determining position prior information, where the position prior information indicates object types in each image block among multiple image blocks of the target image, and the position prior information is used to locate a position of an object in the image content in the target image, and generating the target image based on the descriptive text and the position prior information. By means of implementation of the electronic device provided in the second aspect, a direction and a position of an object generated in the target image can be controlled based on the position prior information, thereby effectively and diversely generating images.

In a third aspect of the present disclosure, a computer program product is provided. The computer program product is tangibly stored in a non-transitory computer-readable medium and includes computer-executable instructions, wherein the computer-executable instructions, when executed by a computer, cause the computer to perform the method according to the first aspect of the present disclosure.

It can be seen from the above description that according to solutions of illustrative embodiments of the present disclosure, a direction and a position of an object generated in the target image can be controlled based on position prior information, thereby effectively and diversely generating images.

It should be understood that this Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which:

FIG. 4 shows a schematic diagram of a generated target image after a position descriptive word is input in a descriptive text according to some embodiments of the present disclosure;

FIG. 5 shows a schematic diagram of a target image according to some embodiments of the present disclosure;

FIG. 8 shows a flow chart of a method for training a spatial perception multi-modal model according to some embodiments of the present disclosure;

FIG. 9 shows a flow chart of a method for generating images according to some embodiments of the present disclosure.

DETAILED DESCRIPTION

Figure 1:
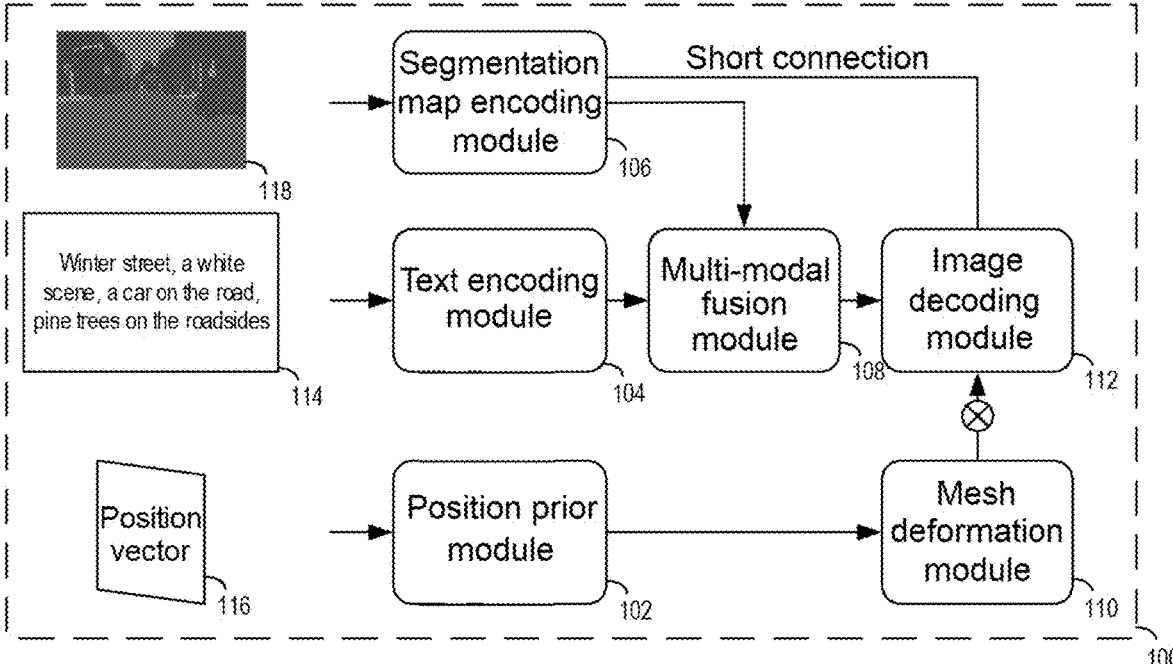
FIG. 1 shows a schematic diagram of a model framework of a spatial perception multi-modal model according to some embodiments of the present disclosure.

The following will describe illustrative embodiments of the present disclosure in more detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

It is very difficult to have a synthetic scene that is close to the real world when training artificial intelligence models. Most of the work focuses on scene synthesis guided by semantic segmentation. The idea is to have a pixel-level classifier. For example, for autonomous driving scenes, the classifier can recognize boundaries of objects on a road. For medical scenarios, it can recognize organs and/or tissues inside and/or outside the human body, but its disadvantage is that it cannot simulate changes caused by physical factors. It should be noted that the application of image generation scenes in this specification is only for illustrative purposes and should not be understood as a limitation to the present disclosure. For example, when an automatic driving scene is taken as an example for illustration, the present disclosure should not be understood as being limited to autonomous driving scenes.

The present disclosure provides a method, an electronic device, and a computer program product for generating images. The method includes acquiring a descriptive text for describing image content of a target image; determining position prior information, where the position prior information indicates object types in each image block among multiple image blocks of the target image, and the position prior information is used to locate a position of an object in the image content in the target image; and generating the target image based on the descriptive text and the position prior information. In the method provided in the present disclosure, a target image in a rare case (such as extreme weather) can be generated by means of an input descriptive text. Therefore, the target image can be used for rare data simulation, for example, can be used to make autonomous vehicles more reliable in real conditions. In some embodiments of the present disclosure, the method provided in the present disclosure allows for position perception editing and operation, and can control, based on position prior information, a direction and a position of an object generated in the target image, thereby effectively and diversely generating images. Moreover, the method provided in the present disclosure is based on object types in each subdivided image block, thus making position perception more accurate.

Figure 2:
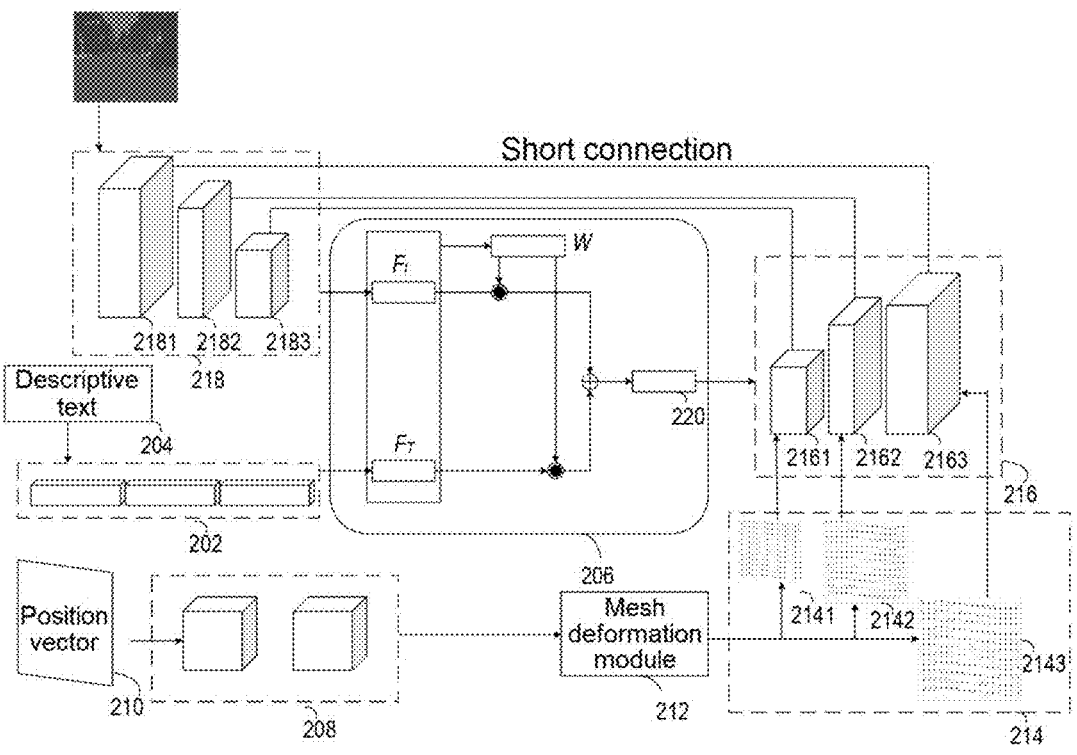
FIG. 2 shows an example architecture diagram of the model framework in FIG. 1 according to some embodiments of the present disclosure.

FIG. 1 shows a schematic diagram of an example model framework 100 of a spatial perception multi-modal model according to some embodiments of the present disclosure. The method provided in the present disclosure can be implemented based on the model framework 100. In some embodiments, the model framework 100 includes a position prior module 102, a text encoding module 104, a segmentation map encoding module 106, a multi-modal fusion module 108, a mesh deformation module 110, and an image decoding module 112. The position prior module 102, the text encoding module 104, and the segmentation map encoding module 106 are respectively used for encoding input information, and the input information of each module is specifically described below. The multi-modal fusion module 108 is used to perform multi-modal fusion on outputs from the text encoding module 104 and the segmentation map encoding module 106, so as to align the outputs from the text encoding module 104 and the segmentation map encoding module 106, i.e., mapping to the same feature space (such as a feature space of the target image). The mesh deformation module 110 is used to perform sample deformation on an output from the position prior module 102 so as to obtain a deformed mesh. The deformed mesh is used to offset a multi-modal fusion feature so as to perform position control on an object. The image decoding module 112 is used to decode the offset multi-modal fusion feature so as to generate a target image. It should be noted that although FIG. 1 shows the model framework 100, in some embodiments, some modules can be selectively activated or deactivated based on different inputs. For example, when no input is made to the segmentation map encoding module 106, the segmentation map encoding module 106 may be deactivated. It can be understood that at this time, the multi-modal fusion module 108 only maps the text encoding module 104 to the above feature space. Functions of the modules in the model framework 100 are explained in detail below with reference to FIG. 2, and FIG. 2 is an example architecture diagram of the model framework 100.

Firstly, a descriptive text 114 for describing image content of a target image can be input to the text encoding module 104. For example, a desired scene to be generated is as follows: a winter street in an overall white image with vehicles on the road and pine trees on the roadside, and the descriptive text 114 "Winter street, a white scene, a car on the road, pine trees on the roadsides" can be input. After receiving the descriptive text 114, the text encoding module 104 can extract a text feature of the descriptive text 114, and input the feature into the multi-modal fusion module 108, and the multi-modal fusion module 108 maps the text feature to the feature space of the target image for subsequent use. Taking FIG. 2 as an example, a text encoding module 202 may include multiple layers (not completely shown) for encoding a descriptive text 204, the encoded feature can also be processed by a series of one-dimensional convolutional layers in the multiple layers to obtain a one-dimensional text feature, and the text feature is input to a multi-modal fusion module 206. The multi-modal fusion module 206 performs feature space mapping and size adjustment on the text feature, and inputs the adjusted feature to the image decoding module 112. For example, after performing feature space mapping, since the obtained feature is a one-dimensional feature, the multi-modal fusion module 206 may convert the mapped feature into a two-dimensional feature (for example, converting a one-dimensional feature of 1024×1 into a two-dimensional feature of 32×32) for use in subsequent image generation.

To locate a direction and a position of an object in the image content in the target image, position prior information or a part of the position prior information can also be input to the position prior module 102. The input position prior information can at least indicate object types of each image block among multiple image blocks of the target image, and the object types may correspond to object types of objects in the image content. For example, in the above example, the position prior information may include which image block(s) the street, the road, the vehicles, and the pine trees respectively exist in.

Figure 3:
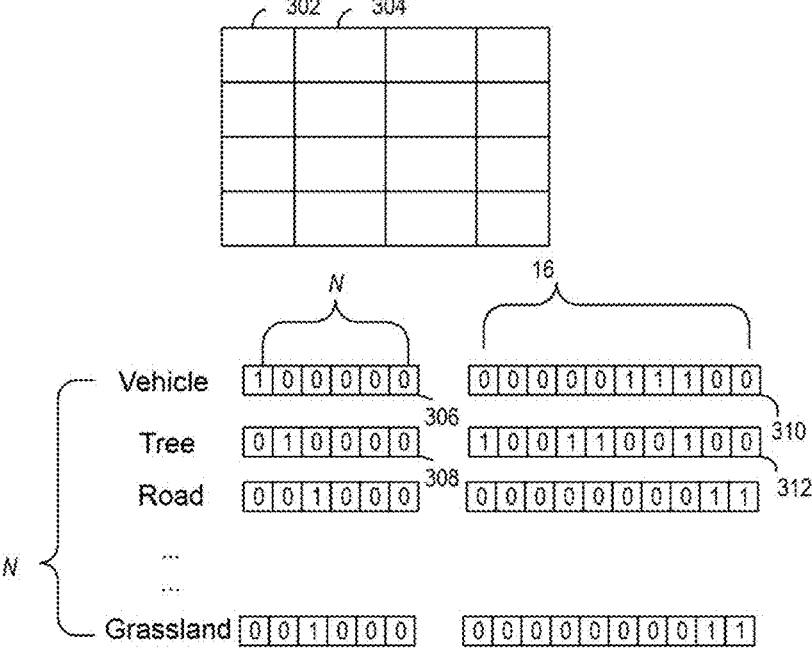
FIG. 3 shows a schematic diagram of one form of position vector according to some embodiments of the present disclosure.

In some examples, the position prior information may include a position vector 116, so as to represent the object types in each image block among the multiple image blocks of the target image in the form of vectors. At this time, the position vector 116 may be input to the position prior module 102. For example, with reference to FIG. 3, FIG. 3 shows one form of position vector. For the target image, it can be predetermined that it is divided into a particular number of image blocks 302, 304 . . . (not all labeled), illustratively 16 image blocks in the figure. Suppose there is a first quantity of objects in the image content, including vehicles, trees, roads, . . . , and grasslands, corresponding one-dimensional vectors 306, 308 . . . can be constructed for each type of object (hereinafter referred to as a first vector for ease of explanation) first, and each constructed first vector is annotated with the recorded data to indicate which type of object the first vector corresponds to. For example, the first quantity of objects can be labeled in an order of vehicles, trees, roads, . . . , and grasslands, starting from 1, and data "1" is annotated at corresponding labeled positions of the objects in each of the first vectors. As shown in FIG. 3, since the label of the vehicles is 1, a first position of the first vector 306 is annotated with data "1." and the rest are annotated with data "0"; since the label of trees is 2, a second position of the first vector 308 is annotated with data "1," and the rest are annotated with data "0," and the rest may be deduced by analogy. It can be understood that there is the first quantity N of the constructed first vectors in total, and a value of a first size of the first vector is equal to the first quantity N; if there are N=16 types of objects in FIG. 3, the first size of the first vector is also 16, that is, the first vector is a one-dimensional vector of 16×1.

Then, for each type of object, one-dimensional vectors 310, 312 . . . (hereinafter referred to as a second vector for case of explanation) of a corresponding second size are constructed. Each constructed second vector is annotated with the recorded data therein to indicate which image block(s) the corresponding object types appear in. For example, each image block can be labeled starting from 1 in an order of from top to bottom and from left to right, and data "1" can be annotated at the labeled position of the image block that includes the corresponding object type in each of the second vectors, and the rest are annotated with data "0." As shown in FIG. 3, if the vehicles are desired to appear in the 6th, 7th, and 8th image blocks of the target image, "1" can be annotated at the 6th, 7th, and 8th positions of the second vector 310, and the rest are annotated with data "0." It can be understood that the value of the second size is equal to the total value of the quantity of the image blocks. For example, for FIG. 3, since there are 16 image blocks in total, the second size is 16, that is, the second vector is a one-dimensional vector of 16×1, although only a portion of each second vector, illustratively comprising 10 of the 16 vector entries, is shown in the figure. It can be understood that the above size, quantity, and annotated data should not be understood as limitations to the present disclosure.

After obtaining the first vector (assumed to be of size N) and the second vector (assumed to be of size 16), they can be combined as a vector of N×(N+16). For example, for each type of object, the corresponding second vectors can be concatenated after the first vector to obtain a third vector of (N+16)×1. It can be understood that the third vector can be used to represent whether there is a specific type of object in each image block of multiple image blocks. Then, third objects of each object are concatenated to obtain a position vector of N×(N+16). Operations such as combination and annotation of position vectors can be performed by a person who desires to generate a target image. For example, a person who desires to generate a target image can generate position vectors with one click after creating information related to the position vectors in a table.

The position prior module 102 performs convolution on the input position vector 116 to obtain a deformed mesh, and input the deformed mesh to the mesh deformation module 110 to determine, through the mesh deformation module 110, how to control the direction and position of an object appearing in the target image. For example, convolution is performed on a position vector 210 by means of a two-dimensional convolutional network in a position prior module 208 of FIG. 2 so as to obtain a deformed mesh, and the deformed mesh is input to a mesh deformation module 212; up-sampling is performed on the deformed mesh by means of the mesh deformation module 212 to determine feature offset information 214 that corresponds to the position vector and is used to control the direction and position of an object appearing in the target image. In some examples, up-sampling can be performed by means of Equation (1):

$$f_d^{i,j} \in F_d, \text{ where } f_d^{i,j} = G(f_{d'}^{i,j}, u_i, v_j) \tag{1}$$

where G is a bicubic interpolation operator, which calculates a center pixel by using the nearest 8 pixels defined by the deformed mesh $u_i$ and $v_j$, $u_i$ refers to an offset on an axis x, $v_j$ refers to an offset on an axis y, $F_d$ refers to calculated feature offset information, and $f_d$ refers to a value of a pixel in the feature offset information.

Based on the feature offset information, spatial sampling can be performed on features of the image decoding module 112 so as to offset the features and control the direction and position of an object appearing in the target image. For example, when the feature offset information is acquired by means of Equation (1), since each pixel in the feature offset information records offset values (the axis x and the axis y), each pixel in the features can be offset based on the offset values.

In some examples, the image decoding module 112 gradually performs up-sampling on the offset features by means of deconvolution layers to obtain a final generated image. For example, in FIG. 2, the image decoding module 216 can perform up-sampling on the features twice, and at this time, the deformed mesh can be up-sampled three times at different scales to obtain feature offset information 2141, 2142, and 2143 of different sizes. The sizes of the feature offset information 2141, 2142, and 2143 are respectively the same as those of feature processed by deconvolution layers 2161, 2162, and 2163, and feature offsetting can be performed at the same scale. By means of offsetting multiple times, inaccurate control and offset of objects with small occupied image areas can be avoided when features only include rough image information without up-sampling.

In some embodiments, when a descriptive text and a position vector are input, a segmentation map 118 can be simultaneously input to a segmentation map encoding module 106, so as to visually describe a position of an object and use cross-modal fusion to combine all different signals as output. At this time, position prior information further includes information in the segmentation map 118. For example, those who desire to generate a target image can obtain an initial image including at least a part of the image content by means of shooting, production, or other means, and then process the initial image to obtain a segmentation map. Then, the segmentation map is input to the segmentation map encoding module 106, an image segmentation feature in the segmentation map is extracted by means of the segmentation map encoding module 106, and the extracted image segmentation feature represents spatial features of the positions of the at least a part of the image content in the target image. In some examples, a two-dimensional image segmentation feature can be extracted by means of a segmentation map encoding module 218 as shown in FIG. 2. The segmentation map encoding module 218 may at least include multiple convolutional layers 2181, 2182, and 2183, which exhibits an asymmetric structure with the image decoding module 216.

After the image segmentation feature is obtained, the segmentation map encoding module 106 inputs the image segmentation feature to the multi-modal fusion module 108. The multi-modal fusion module 108 maps the text feature and the image segmentation feature to the same feature space for multi-modal fusion so as to generate a multi-modal fusion feature 220. In some examples, multi-modal fusion can be performed by means of the multi-modal fusion module 206 as shown in FIG. 2. The multi-modal fusion module 206 processes the text feature and the image segmentation feature based on a self-attention mechanism. To align the text feature with the image segmentation feature, an average pooling operator can be firstly used to compress the text feature and the image segmentation feature into one-dimensional vectors, and then regularize them to obtain $F_T$ and $F_I$, where $F_T$ refers to the processed text feature, and $F_I$ refers to the processed image segmentation feature. In this way, the image and the text can be constrained in the same distribution for feature fusion.

Then, the weight W is determined by means of the self-attention mechanism, illustratively in accordance with Equation (2) and Equation (3):

$$F_{IT} = conv(concateF_I, F_T) \qquad (2)$$

$$W = \sum \left( S\left( \frac{Q_{FIT} K_{FIT}^T}{\sqrt{d}} \right) V_{FIT} \right) \qquad (3)$$

where concate refers to a concatenating operation, conv refers to a convolution operation, $Q_{FIT}$, $K_{FIT}$, and $V_{FIT}$ respectively refer to the query, key, and value of the concatenated features, and S refers to the softmax function. $F_I$ and $F_T$ can be fused by means of W, as shown in Equation (4):

$$F_{con} = W \cdot F_I + (1 - W) \cdot F_T \qquad (4)$$

where W is a confidence level score ranging from 0 to 1 and is used to represent the importance between the text feature and the image segmentation feature. $F_{con}$ is an output feature and can be converted into a two-dimensional feature (for example, a one-dimensional feature of 1024×1 is converted into a two-dimensional feature of 32×32) for subsequent image generation. It can be understood that if only the segmentation map or the descriptive text is input to the model, the W of the input information is adapted accordingly.

Since an image is a visual aid for describing the position and texture of a scene object, while text is a high-level abstraction that includes human knowledge of traffic scenes, combining these two types of information can encourage the model to find the collinearity between the text and the image, and the generation of the target image can be better monitored by combining different signals. Meanwhile, the collinearity between the text and the image can enhance feature representation for better image generation.

In some embodiments, to improve accuracy of image generation and avoid feature generalization in the feature fusion process, a short connection can also be constructed between the segmentation map encoding module 218 and the image decoding module 216, and the image segmentation feature can be shared between the segmentation map encoding module 218 and the image decoding module 216. As shown in FIG. 2, short connections can be constructed between convolutional layer 2181 and deconvolutional layer 2163, convolutional layer 2182 and deconvolutional layer 2162, convolutional layer 2183 and deconvolutional layer 2161 of the same size.

Besides monitoring a position of an object in the target image by means of the position vector and segmentation map, a position descriptive word can also be input to the descriptive text.

FIG. 4 shows a case of the generated target image after inputting a position descriptive word to the descriptive text. At this time, if an example model framework of a spatial perception multi-modal model in FIG. 1 is used to generate the target image, the text encoding module 104 extracts the feature of the position descriptive word while extracting a text feature, so as to further control a position of the object in the target image. It can be seen that by adding the position descriptive word to the descriptive text, the position of the object in the target image can be further effectively monitored.

FIG. 5 shows target images 508 and 510 generated after inputting descriptive texts 502 and 504, a segmentation map 506, and a position vector (not shown) by means of the method provided in the present disclosure. Also shown is an image 512 generated by a conventional method. It can be seen that the descriptive text can be used as a condition in the method provided in the present disclosure to generate more specific scenario results, while only one scenario can be generated by the conventional method.

Figures 6, 7:
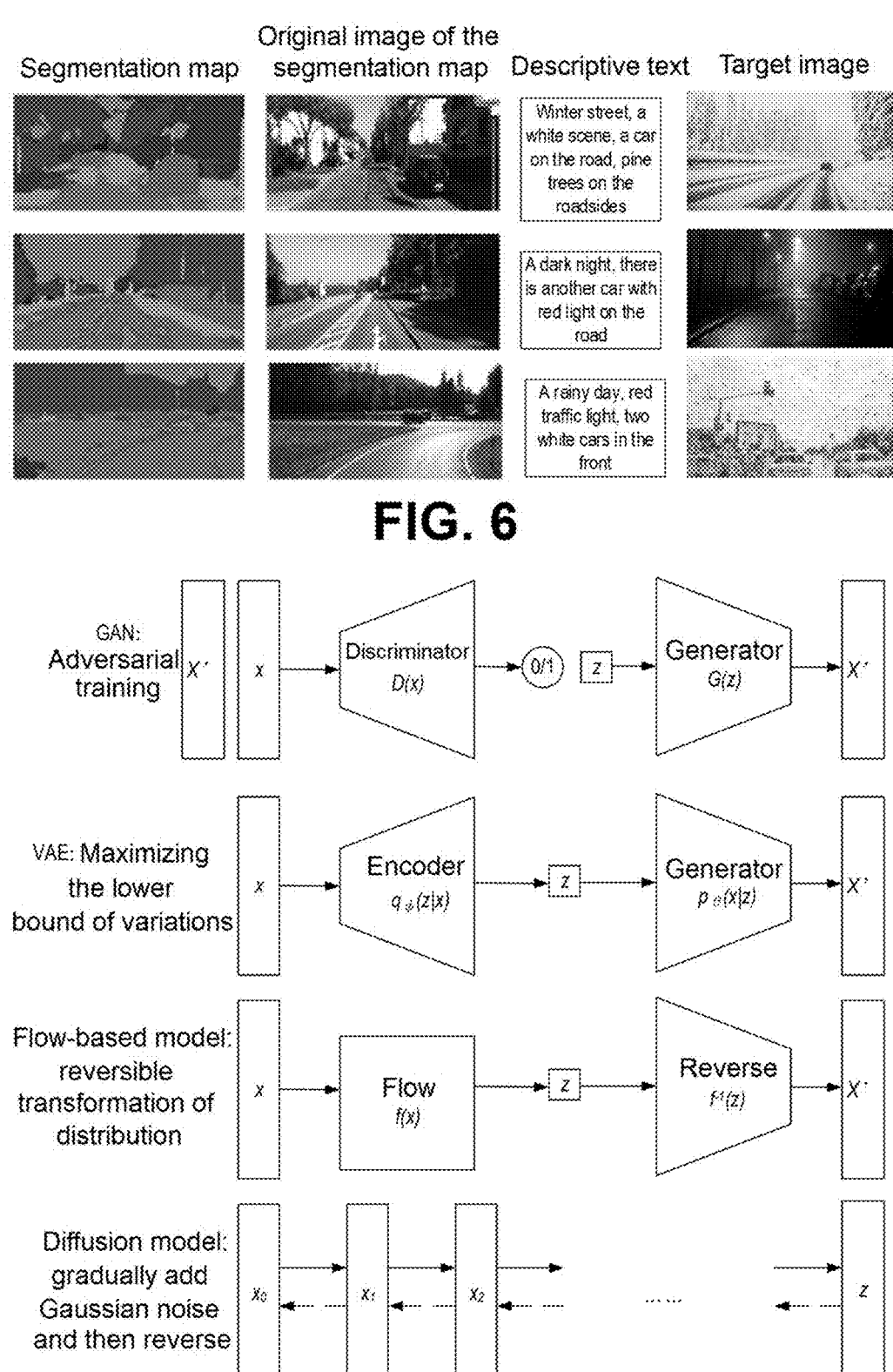
FIG. 6 shows another schematic diagram of a target image according to some embodiments of the present disclosure.
FIG. 7 shows a schematic diagram of an example model that can be combined with a spatial perception multi-modal model to generate a target image according to some embodiments of the present disclosure.

FIG. 6 shows another example of the generated target image in the present disclosure. Hence, by means of the segmentation map, the descriptive text, and the position vector (not shown), the position of the object in the target image can be accurately controlled, and the desired target image can be obtained.

FIG. 7 shows some example models that can be combined with the example model framework of the spatial perception multi-modal model in FIG. 1 for efficiently generating the target image. In some embodiments, parameters of the example models in FIG. 7 can be used as parameters of some modules in the spatial perception multi-modal model. For example, parameters for decoding generated images in the example model can be used as some parameters in an image decoding modules 112 or 216. The example model shown in FIG. 7 can be used to extract potential features that summarize key attributes of a target dataset, and then potential optimization can be used to extract new data from the potential features. According to potential representation, the method can be divided into an explicit generative model and an implicit generative model. For the explicit generative model, there are three main categories: 1. a variational auto-encoder (VAE); 2. a flow-based model (e.g., Flow); 3. a diffusion model. For the implicit generative model, the most popular is a generative adversarial network (GAN).

The GAN uses a generator and a discriminator to compete with each other to generate fake samples. The discriminator serves as a classifier to monitor the data generated by the generator. When the discriminator gives a 50% judgment on whether a fake sample is true or false, the competition will stop. One representative method is pix2pixHD, which consists of a two-stage GAN that learns to generate images from coarse to fine.

The VAE is known for its dimensionality reduction. The VAE has learned the multivariate Gaussian representation of images. The learned mean u and variance σ are used to sample potential vectors. Overall optimization minimizes the KL divergence between the posteriors of the real data and the generated data. VQ-VAE and VQ-VAE-2 are two representative methods that use the VAE to learn data distribution to generate high-quality images.

On the other hand, Flow learns a probability density function of the real data. By means of a series of transformations, the distribution of a final target variable is finally obtained by repeatedly replacing the variable with a new one according to the variable change theorem. The disadvantage of Flow is its large amount of calculation, which makes it easy to degenerate. Glow is one of the effective methods for processing large image compression and generation. Its idea is to use a reversible 11 convolution layer to simplify the model.

The diffusion model has recently attracted attention due to its flexible and effective optimization. The diffusion model extends the idea of re-parameterization technique in one-dimensional potential space to two-dimensional feature domain. To reduce complexity, a Markov chain can be established to generate a forward (backward) diffusion process of a sample by slowly adding (removing) noise. The whole process iteratively approximates the conditional probability of the real sample of the given noise.

The spatial perception multi-modal model provided in the present disclosure or the spatial perception multi-modal model combined with one or more of the example models in FIG. 7 can customize a position of an object in the target image by means of the position prior information. Meanwhile, by inputting the descriptive text, the image content of the target image can be freely controlled. On the one hand, it can accept text prompts from human beings to generate conditional images, thereby controlling the direction of data generation and enhancing and perfecting the model. Taking an autonomous driving scenario as an example, in the real world, the driving scenario varies greatly due to frequent road construction and different traffic conditions. Therefore, the spatial editing provided in the present disclosure is a huge advantage for generating the autonomous driving scenario. On the other hand, a target image including rare image content can be automatically generated, and the quantity of the target images that can be generated can be increased, thereby avoiding the memory and computing capability limitations for most edge devices; the autonomous driving system is efficiently trained to establish a channel for continuous learning and updating. For example, the spatial perception multi-modal mode provided in the present disclosure can be connected with the autonomous driving system.

The present disclosure further provides a method for training a spatial perception multi-modal model. With reference to FIG. 8, a flow chart of the method is shown. At block 800, a sample dataset is acquired, and the sample dataset includes a sample descriptive text, position prior information corresponding to the descriptive text, and a real image. In some embodiments, the sample dataset may further include a sample segmentation map. At block 802, a sample target image is output by means of a predetermined image generation model based on the sample descriptive text and the position prior information. The predetermined image generation model may refer to a spatial perception multi-modal model that has not been trained or a spatial perception multi-modal model in training. The above text can be referred to for a specific processing flow. In some embodiments, the sample segmentation map can be simultaneously input to the predetermined image generation model to output a sample target image. The above text can be referred to for a specific processing flow.

At block 804, the predetermined image generation model is trained by means of contrastive loss, adversarial loss, and average error loss based on a similarity label between the real image and the sample target image, a similarity label between the sample descriptive text and the sample target image, the sample dataset (for example, the real image and the sample descriptive text therein), and the sample target image.

To train the predetermined image generation model, the contrastive loss can be used to align the image with the text feature, the adversarial loss can be used to monitor the visual quality of the generated sample target image, and L1 loss can be used to calculate pixel differences between the generated sample target image and the real image.

Here, the contrastive loss can be determined in accordance with Equation (5):

$$L_{cons} = S\left(\frac{\cos(F(T),\,F(I_r'))\cdot\cos(F(T),\,F(I_r'))^T}{e^t}\right)\cdot P_{IT} + \qquad (5)$$
$$S\left(\frac{\cos(F(I_r),\,F(I_r'))\cdot\cos(F(I_r),\,F(I_r'))^T}{e^o}\right)\cdot P_{II}$$

where $L_{cons}$ is contrastive loss, $F(T)$ is a feature of the sample descriptive text, $$F(I_r')$$

is an image feature of the sample target image, $F(I_r)$ is an image feature of the real image, cos refers to calculation of the cosine similarity, T is transposition, and $P_{IT}$ and $P_{II}$ respectively refer to the similarity labels between the sample descriptive text and the sample target image. The similarity labels between the sample descriptive text and the sample target image are values ranging from 0 to 1 and are used to represent similarity degrees between the sample descriptive text and the sample target image and between the sample descriptive text and the sample target image. S indicates the softmax function, and other parameters are predetermined parameters. Equation (5) encourages the generated sample target image to be consistent with the real image and the sample descriptive text.

For adversarial loss $L_{adv}$, a discriminator is used to recognize whether the generated sample target image is visually similar to the real image. The discriminator is pretrained on an open-source dataset. The adversarial loss can encourage the generation of sample target images that are approximate to real-world scenarios (such as traffic scenes). L1 loss $L_{mae}$ calculates a mean absolute error between the sample target image and the real image to minimize distortion.

When training, the weighted sum of $L_{cons}$, $L_{adv}$, and $L_{mae}$ can be calculated as the total loss, that is, Equation (6):

$$L = \alpha L_{cons} + \beta L_{adv} + \omega L_{mae} \tag{6}$$

where the weights $\alpha$, $\beta$ and $\omega$ are weighting factors and are used for balancing loss terms with the same numerical scale.

In some embodiments, the spatial perception multi-modal model can be further trained by means of structural similarity (SSIM) loss. The SSIM loss calculates a pixel level difference between the sample target image and the separated images, that is, $L_{ssim}$, which focuses on the edges of the objects, ensuring that the sample target image has an ideal scene structure. At this time, the weighted sum of $L_{cons}$, $L_{adv}$, $L_{ssim}$, and $L_{mae}$ can be calculated as the total loss, that is, Equation (7):

$$L = \alpha L_{cons} + \beta L_{adv} + \gamma L_{ssim} + \omega L_{mae} \tag{7}$$

where the weights $\alpha$, $\beta$, $\gamma$ and $\omega$ are weighting factors and are used for balancing loss terms with the same numerical scale.

At block 806, the trained image generation model is determined. Through training, the parameters in the model can be adjusted. For example, when training the spatial perception multi-modal model in FIG. 2, parameters in the text encoding module 202, the multi-modal fusion module 206, the position prior module 208, the image encoding module 216, the segmentation map encoding module 218, and other sections can be continuously adjusted until a trained image generation model satisfying the termination condition is obtained.

The present disclosure further provides a method for generating images. With reference to FIG. 9, a flow chart of the method is shown. At block 900, a descriptive text for describing image content of a target image is acquired. The descriptive text can be input by a user or automatically generated by a machine, which is not limited in the present disclosure. The image content included in the descriptive text can include information such as objects in the target image, an overall image style, the season, and the weather. In addition, in some embodiments, the image content described by the descriptive text not only includes the expected objects in the target image, but also includes the position monitoring words of the objects, for example, referring to FIG. 4.

At block 902, position prior information is determined, where the position prior information includes object types in each image block among multiple image blocks of the target image, and is used to locate a position of an object in the image content in the target image. In some embodiments, the position prior information may include a position vector, and the above text and FIG. 3 may be referred to for the example description of the position vector. In some embodiments, the size of the position vector may be related to the total quantity of image blocks of the multiple image blocks and the quantity of object types. In some other embodiments, the position prior information may also include an image segmentation feature in a segmentation map, so as to further monitor the position of the object in the target image by means of spatial features in the segmentation map and monitor image generation by means of the collinearity of the text and the image feature, thereby further improving the accuracy of image generation. The segmentation map can be obtained after processing an image obtained by shooting, production, or other means.

At block 904, the target image is generated based on the descriptive text and the position prior information. In some embodiments, the position prior information only includes the position vector. At this time, a text feature of the descriptive text can be extracted, and the text feature is mapped to a specific feature space. Meanwhile, processing such as mesh deformation is performed on the position vector to obtain feature offset information, and feature offsetting is performed on the mapped text feature based on the feature offset information to obtain features for generating the target image. For example, the position vector can be input to the position prior module 102, the descriptive text is input to the text encoding module 104, and processing is performed based on the example frame in FIG. 1 so as to generate the target image. It can be understood that the segmentation map encoding module 106 need not be activated at this time.

In some embodiments, the feature offset information of multiple different sizes can be obtained, and feature offsetting can be performed multiple times based on the feature offset information of multiple different sizes. The multiple times of feature offsetting are respectively corresponding to the features that are up-sampled multiple times and used for generating the target image. For example, processing can be performed based on the mesh deformation module 212 and the image decoding module 216 in FIG. 2.

In some embodiments, the position prior information further includes an image segmentation feature. At this time, after multi-modal feature fusion is performed on the image segmentation feature and the text feature, feature offsetting is performed on the multi-modal fusion feature based on the feature offset information to obtain features for generating the target image. For example, the segmentation map can be input to the segmentation map encoding module 106 in FIG. 1 to extract the image segmentation feature, multi-modal feature fusion is performed on the image segmentation feature and the text feature in the multi-modal fusion module 108, and then feature offsetting is performed on the multi-modal fusion feature. Similarly, the feature offset information of multiple different sizes can be obtained, and feature offsetting can be performed multiple times based on the feature offset information of multiple different sizes. For example, processing can be performed based on the mesh deformation module 212 and the image decoding module 216 in FIG. 2. In some embodiments, the image segmentation feature can be further fused with the multi-modal fusion feature so as to avoid feature generalization during the multi-modal feature fusion process. For example, the image segmentation feature can be shared between the segmentation map encoding module 106/218 and the image decoding module 112/216 based on the short connection in FIGS. 1 and 2.

According to the above-described various embodiments of the present disclosure and their combined embodiments, the efficiency of configuring functional states can be improved. It should be understood that the implementations shown in FIG. 1 to FIG. 9 above are only illustrative examples in schematic form. According to practical applications, the architecture or processes shown in FIG. 1 to FIG. 9 may have other different forms and may further include more or fewer one or more functional modules and/or units, and the modules and/or units may be partially or completely implemented as hardware modules, software modules, firmware modules, or any combination thereof, which is not limited in embodiments of the present disclosure.

It can be understood that the specific names and/or protocols of the various components of the system described herein are intended only to help those skilled in the art better understand the ideas of the present disclosure and are not intended to limit the scope of the present disclosure in any way. Further, in other embodiments, more or better components may be included, as well as alternative components having the same or similar functions.

Figure 10:
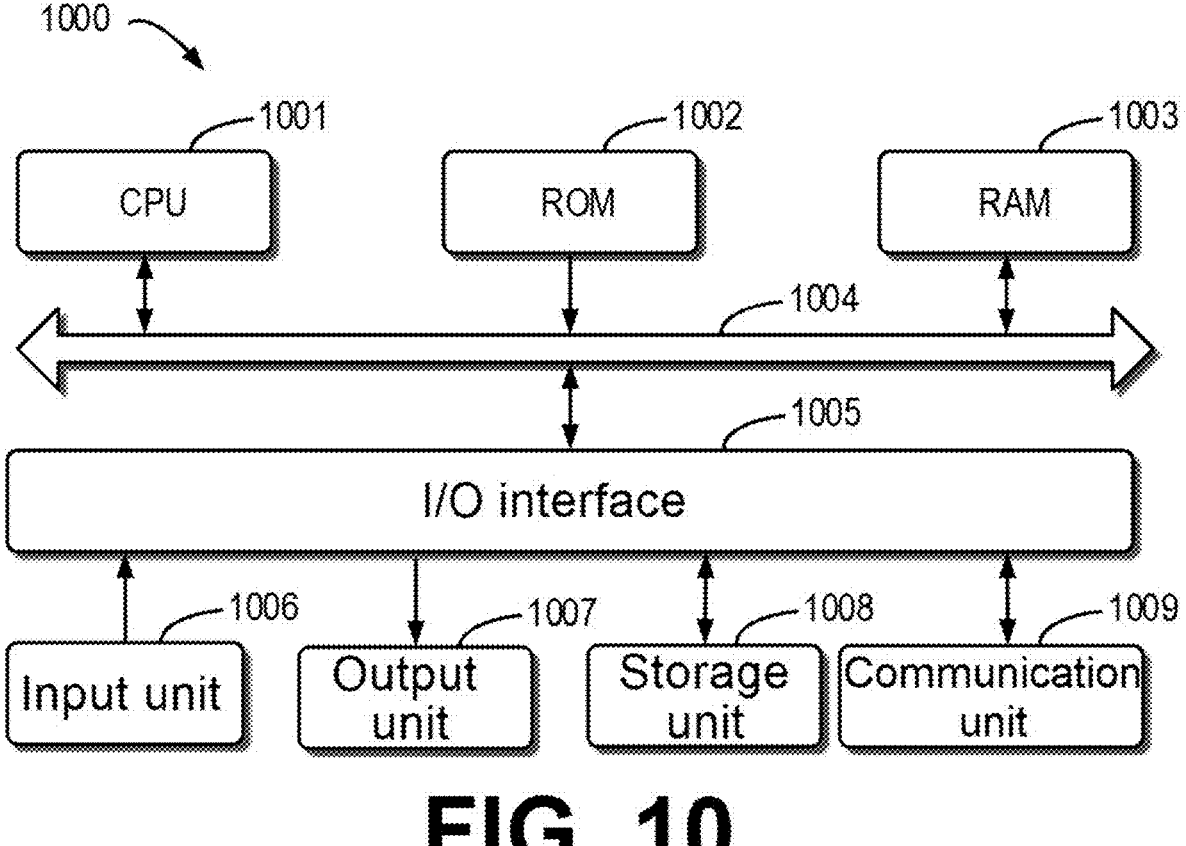
FIG. 10 shows a block diagram of a device that can be used to implement some embodiments of the present disclosure.

FIG. 10 shows a block diagram of an example device 1000 that can be used to implement some embodiments according to the present disclosure. The device 1000 may be implemented as a server or a PC, and the specific implementation type of the device 1000 is not limited in embodiments of the present disclosure. As shown in FIG. 10, the device 1000 includes a central processing unit (CPU) 1001 that may perform various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The CPU 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, such as a keyboard and a mouse; an output unit 1007, such as various types of displays and speakers; the storage unit 1008, e.g., a magnetic disk and an optical disc; and a communication unit 1009, such as a network card, a modem, and a wireless communication transceiver. The communication unit 1009 allows the device 1000 to exchange information/data with other devices via a computer network, e.g., the Internet, and/or various telecommunication networks.

The CPU 1001 may execute the methods and/or processing as described above, e.g., the method in FIG. 8 or FIG. 9. For example, in some embodiments, the method in FIG. 8 or FIG. 9 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 1009. When the computer program is loaded to the RAM 1003 and executed by CPU 1001, one or more steps of the method of FIG. 8 or FIG. 9 as described above may be performed. Alternatively, in other embodiments, the CPU 1001 may be configured to perform the method of FIG. 8 or FIG. 9 in any other appropriate manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

The program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams. The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flow charts and/or block diagrams.

In the context of the present disclosure, a machine-readable medium may be a tangible medium that may include or store a program for use by an instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, and the module, program segment, or part of an instruction includes one or more executable instructions for implementing specified logical functions. In some alternative implementations, functions marked in the blocks may also occur in an order different from that marked in the accompanying drawings. For example, two successive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a special-purpose hardware-based system that executes specified functions or actions, or using a combination of special-purpose hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

Various embodiments of the present disclosure have been described above. The foregoing description is illustrative rather than exhaustive, and is not limited to the embodiments disclosed. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the various embodiments disclosed herein.

What is claimed is:

1. A method, comprising:

acquiring, in a processor-based machine learning system, a descriptive text for describing image content of a target image;

determining, in the processor-based machine learning system, position prior information, wherein the position prior information indicates one or more object types in each of one or more image blocks among multiple image blocks of the target image, and the position prior information is used to locate a position of an object in the image content in the target image; and generating, utilizing at least one machine learning model of the processor-based machine learning system, the target image based on the descriptive text and the position prior information;

wherein the position prior information comprises at least one position vector, and the at least one position vector is used to indicate the one or more object types in each of the one or more image blocks among the multiple image blocks, the position vector comprising for a given one of the object types an identifier of that object type and a corresponding set of block-level indicators for respective ones of the image blocks, wherein each of the block-level indicators in the position vector indicates whether or not at least a portion of an object of the given object type is present in a corresponding image block;

wherein the at least one machine learning model comprises (i) a multi-modal fusion component configured to map an encoded version of the descriptive text to a feature space of the target image, and (ii) a convolutional network component configured to generate a deformed mesh by processing the position vector; and wherein generating the target image comprises coupling outputs of the multi-modal fusion component and the convolutional network component to respective inputs of an image decoder, with an output of the image decoder providing the target image, and the deformed mesh being utilized to provide feature offset information that corresponds to the position vector and is processed in the image decoder to control at least a position of an object appearing in the target image.

2. The method according to claim 1, wherein the position vector comprises a combination of a first quantity of one-dimensional vectors of a first size and the first quantity of one-dimensional vectors of a second size respectively corresponding to the first quantity of one-dimensional vectors of the first size, a value of the first size is equal to the first quantity, the first quantity is the quantity of the object types, a value of the second size is equal to the total quantity of image blocks of the multiple image blocks, and a combination of each one-dimensional vector of the first size and a corresponding one-dimensional vector of the second size is used to represent whether there is a specific type of object in each image block among the multiple image blocks.

3. The method according to claim 1, wherein determining the position prior information further comprises:

acquiring a segmentation map, wherein the segmentation map comprises at least a part of the image content; and determining, based on the segmentation map, an image segmentation feature in the segmentation map also comprised in the position prior information, wherein the image segmentation feature is used to indicate a position of the at least a part of the image content in the target image.

4. The method according to claim 3, wherein generating the target image comprises:

determining a text feature of the descriptive text;

generating a multi-modal fusion feature based on the text feature and the image segmentation feature; and generating the target image based on the position vector and the multi-modal fusion feature.

5. The method according to claim 4, wherein generating the target image further comprises:

determining the feature offset information corresponding to the position vector;

determining an offset multi-modal fusion feature based on the feature offset information and the multi-modal fusion feature; and generating the target image based on the offset multi-modal fusion feature.

6. The method according to claim 5, wherein the feature offset information comprises feature offset information of multiple sizes, and determining the multi-modal fusion feature comprises:

determining first feature offset information with the same size as the multi-modal fusion feature in the feature offset information of multiple sizes;

determining the offset multi-modal fusion feature based on the first feature offset information and the multi-modal fusion feature;

performing up-sampling on the multi-modal fusion feature;

determining second feature offset information with the same size as the up-sampled multi-modal fusion feature in the feature offset information of multiple sizes; and determining, based on the second feature offset information and the multi-modal fusion feature, the multi-modal fusion feature that is offset again.

7. The method according to claim 4, wherein the multi-modal fusion feature is generated based on a self-attention mechanism, and the self-attention mechanism is used to fuse the text feature and the image segmentation feature according to a measure of importance between the text feature and the image segmentation feature.

8. The method according to claim 4, wherein the method further comprises:

generating an updated multi-modal fusion feature based on the multi-modal fusion feature and the image segmentation feature.

9. The method according to claim 1, further comprising:

acquiring a sample dataset, wherein the sample dataset comprises a sample descriptive text, position prior information corresponding to the sample descriptive text, and a real image;

outputting a sample target image by means of a predetermined image generation model based on the sample descriptive text and the position prior information;

training the predetermined image generation model by means of contrastive loss, adversarial loss, and average error loss based on a similarity label between the real image and the sample target image, a similarity label between the sample descriptive text and the sample target image, the sample dataset, and the sample target image, wherein the contrastive loss is the loss between the sample descriptive text and the sample target image and between the real image and the sample target image respectively, and the adversarial loss and the average error loss are the loss between the real image and the sample target image; and determining the trained image generation model.

10. The method according to claim 9, wherein the sample dataset further comprises a sample segmentation map, and training the predetermined image generation model further comprises:

training the predetermined image generation model by means of structural similarity loss based on the sample segmentation map and the sample target image, wherein the structural similarity loss is the loss between the sample segmentation map and the sample target image.

11. The method according to claim 9, wherein the contrastive loss is used to train the predetermined image generation model according to a similarity between the descriptive text and the target image, a similarity between the real image and the target image, a similarity label between the real image and the sample target image, and a similarity label between the sample descriptive text and the sample target image.

12. An electronic device, comprising:

at least one processor; and memory coupled to the at least one processor and having instructions stored therein, wherein the instructions, when executed by the at least one processor, cause the electronic device to perform operations comprising:

acquiring, in a processor-based machine learning system, a descriptive text for describing image content of a target image;

determining, in the processor-based machine learning system, position prior information, wherein the position prior information indicates one or more object types in each of one or more image blocks among multiple image blocks of the target image, and the position prior information is used to locate a position of an object in the image content in the target image; and generating, utilizing at least one machine learning model of the processor-based machine learning system, the target image based on the descriptive text and the position prior information;

wherein the position prior information comprises at least one position vector, and the at least one position vector is used to indicate the one or more object types in each of the one or more image blocks among the multiple image blocks, the position vector comprising for a given one of the object types an identifier of that object type and a corresponding set of block-level indicators for respective ones of the image blocks, wherein each of the block-level indicators in the position vector indicates whether or not at least a portion of an object of the given object type is present in a corresponding image block;

wherein the at least one machine learning model comprises (i) a multi-modal fusion component configured to map an encoded version of the descriptive text to a feature space of the target image, and (ii) a convolutional network component configured to generate a deformed mesh by processing the position vector; and wherein generating the target image comprises coupling outputs of the multi-modal fusion component and the convolutional network component to respective inputs of an image decoder, with an output of the image decoder providing the target image, and the deformed mesh being utilized to provide feature offset information that corresponds to the position vector and is processed in the image decoder to control at least a position of an object appearing in the target image.

13. The electronic device according to claim 12, wherein the position vector comprises a combination of a first quantity of one-dimensional vectors of a first size and the first quantity of one-dimensional vectors of a second size respectively corresponding to the first quantity of one-dimensional vectors of the first size, a value of the first size is equal to the first quantity, the first quantity is the quantity of the object types, a value of the second size is equal to the total quantity of image blocks of the multiple image blocks, and a combination of each one-dimensional vector of the first size and a corresponding one-dimensional vector of the second size is used to represent whether there is a specific type of object in each image block among the multiple image blocks.

14. The electronic device according to claim 12, wherein determining the position prior information further comprises:

acquiring a segmentation map, wherein the segmentation map comprises at least a part of the image content; and determining, based on the segmentation map, an image segmentation feature in the segmentation map also comprised in the position prior information, wherein the image segmentation feature is used to indicate a position of the at least a part of the image content in the target image.

15. The electronic device according to claim 14, wherein generating the target image comprises:

determining a text feature of the descriptive text;

generating a multi-modal fusion feature based on the text feature and the image segmentation feature; and generating the target image based on the position vector and the multi-modal fusion feature.

16. The electronic device according to claim 15, wherein generating the target image further comprises:

determining the feature offset information corresponding to the position vector;

determining an offset multi-modal fusion feature based on the feature offset information and the multi-modal fusion feature; and generating the target image based on the offset multi-modal fusion feature.

17. The electronic device according to claim 16, wherein the feature offset information comprises feature offset information of multiple sizes, and determining the multi-modal fusion feature comprises:

determining first feature offset information with the same size as the multi-modal fusion feature in the feature offset information of multiple sizes;

determining the offset multi-modal fusion feature based on the first feature offset information and the multi-modal fusion feature;

performing up-sampling on the multi-modal fusion feature;

determining second feature offset information with the same size as the up-sampled multi-modal fusion feature in the feature offset information of multiple sizes; and determining, based on the second feature offset information and the multi-modal fusion feature, the multi-modal fusion feature that is offset again.

18. A computer program product comprising a non-transitory computer-readable medium having computer-executable instructions stored therein, wherein the computer-executable instructions, when executed by a computer, cause the computer to perform operations comprising:

acquiring, in a processor-based machine learning system, a descriptive text for describing image content of a target image;

determining, in the processor-based machine learning system, position prior information, wherein the position prior information indicates one or more object types in each of one or more image blocks among multiple image blocks of the target image, and the position prior information is used to locate a position of an object in the image content in the target image; and generating, utilizing at least one machine learning model of the processor-based machine learning system, the target image based on the descriptive text and the position prior information;

wherein the position prior information comprises at least one position vector, and the at least one position vector is used to indicate the one or more object types in each of the one or more image blocks among the multiple image blocks, the position vector comprising for a given one of the object types an identifier of that object type and a corresponding set of block-level indicators for respective ones of the image blocks, wherein each of the block-level indicators in the position vector indicates whether or not at least a portion of an object of the given object type is present in a corresponding image block;

wherein the at least one machine learning model comprises (i) a multi-modal fusion component configured to map an encoded version of the descriptive text to a feature space of the target image, and (ii) a convolutional network component configured to generate a deformed mesh by processing the position vector; and wherein generating the target image comprises coupling outputs of the multi-modal fusion component and the convolutional network component to respective inputs of an image decoder, with an output of the image decoder providing the target image, and the deformed mesh being utilized to provide feature offset information that corresponds to the position vector and is processed in the image decoder to control at least a position of an object appearing in the target image.

19. The computer program product according to claim 18, wherein the position vector comprises a combination of a first quantity of one-dimensional vectors of a first size and the first quantity of one-dimensional vectors of a second size respectively corresponding to the first quantity of one-dimensional vectors of the first size, a value of the first size is equal to the first quantity, the first quantity is the quantity of the object types, a value of the second size is equal to the total quantity of image blocks of the multiple image blocks, and a combination of each one-dimensional vector of the first size and a corresponding one-dimensional vector of the second size is used to represent whether there is a specific type of object in each image block among the multiple image blocks.

20. The computer program product according to claim 18, wherein the operations further comprise:

acquiring a sample dataset, wherein the sample dataset comprises a sample descriptive text, position prior information corresponding to the sample descriptive text, and a real image;

outputting a sample target image by means of a predetermined image generation model based on the sample descriptive text and the position prior information;

training the predetermined image generation model by means of contrastive loss, adversarial loss, and average error loss based on a similarity label between the real image and the sample target image, a similarity label between the sample descriptive text and the sample target image, the sample dataset, and the sample target image, wherein the contrastive loss is the loss between the sample descriptive text and the sample target image and between the real image and the sample target image respectively, and the adversarial loss and the average error loss are the loss between the real image and the sample target image; and determining the trained image generation model.

* * * * *